United States Patent
Wang et al.

(10) Patent No.: US 11,843,727 B2
(45) Date of Patent: Dec. 12, 2023

(54) NETWORK DEVICE, SYSTEM AND METHOD FOR VIDEO CONTENT PROCESSING

(71) Applicant: ARRIS ENTERPRISES LLC, Suwanee, GA (US)

(72) Inventors: Qi Wang, Shanghai (CN); Wan-Ting Yang, Shanghai (CN); Hanlin Zhang, Shanghai (CN); Min Wei, Shanghai (CN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/903,099

(22) Filed: Sep. 6, 2022

(65) Prior Publication Data

US 2023/0079620 A1  Mar. 16, 2023

(30) Foreign Application Priority Data

Sep. 16, 2021 (CN) .......................... 202111085474.7

(51) Int. Cl.
*H04N 21/2365* (2011.01)
*H04N 21/234* (2011.01)

(52) U.S. Cl.
CPC ....... *H04N 21/2365* (2013.01); *H04N 21/234* (2013.01)

(58) Field of Classification Search
None
See application file for complete search history.

(56) References Cited

U.S. PATENT DOCUMENTS 8,687,121 B2  4/2014  Watanabe et al.
10,708,649 B2 * 7/2020  Yuan ................... H04N 21/4316
(Continued)

FOREIGN PATENT DOCUMENTS

CN  111601150  8/2020

*Primary Examiner* — Junior O Mendoza
(74) *Attorney, Agent, or Firm* — Panitch Schwarze Belisario & Nadel LLC

(57) ABSTRACT

Network device, system, method and computer readable medium for video content processing. The network device includes a memory having instructions stored thereon, and a processor configured to execute the instructions to cause the network device: to acquire a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into continuous N picture units in the horizontal direction, each picture unit is used for playing the corresponding video stream segments, and the time from the left edge of the first frame of the corresponding video stream segment entering the picture unit from the right side of the picture unit to the left edge of the kth frame leaving the picture unit from the left side of the picture unit is T; decoding the main video by a main decoder of the network device; decoding video stream segments corresponding to odd-numbered picture units by a first sub-decoder of the network device, and decoding video stream segments corresponding to even-numbered picture units by a second sub-decoder of the network device; and playing the main video and the plurality of video stream segments.

20 Claims, 7 Drawing Sheets

(56) References Cited

U.S. PATENT DOCUMENTS

| | | | |
|---|---|---|---|
| 2016/0366466 A1* | 12/2016 | Shen | G06Q 50/01 |
| 2020/0058270 A1* | 2/2020 | Li | H04N 21/472 |
| 2020/0195877 A1* | 6/2020 | Li | G06F 3/04812 |
| 2021/0185386 A1* | 6/2021 | Kong | H04N 21/4394 |
| 2022/0139353 A1* | 5/2022 | Hu | H04N 21/44008 |
| | | | 345/629 |
| 2022/0182739 A1* | 6/2022 | Duan | H04N 21/8586 |
| 2023/0011255 A1* | 1/2023 | Tang | H04N 21/2343 |

* cited by examiner

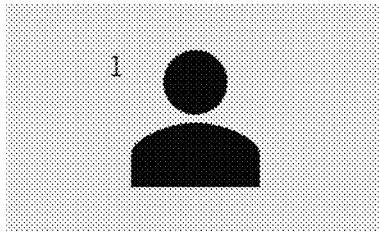 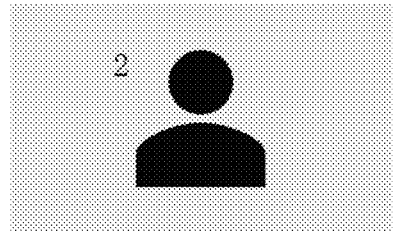
Fig. 6A and Fig. 6B
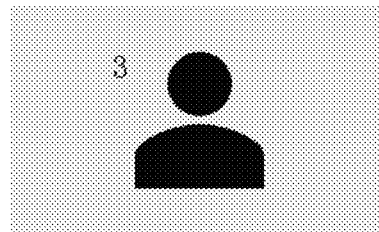 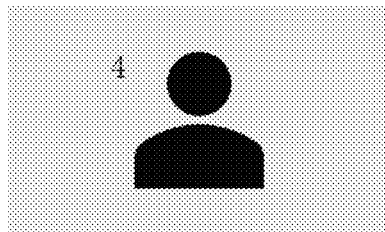
Fig. 6C and Fig. 6D
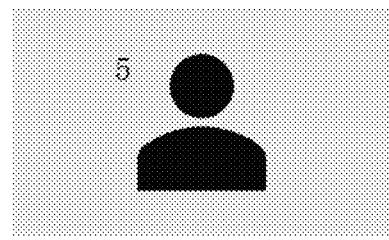
Fig. 6E

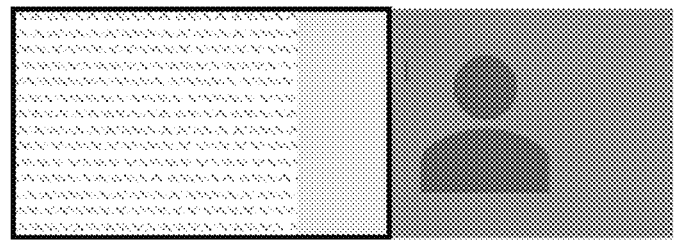
Fig. 7A
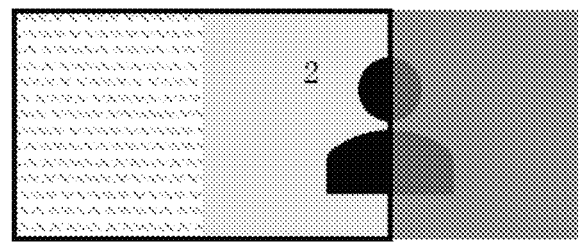
Fig. 7B
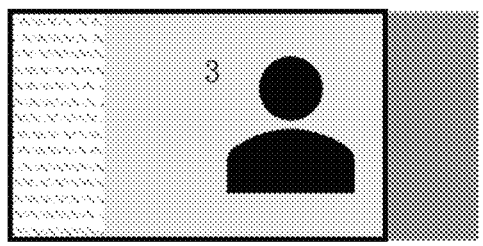 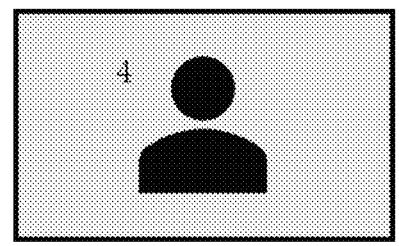
Fig. 7C and Fig. 7D
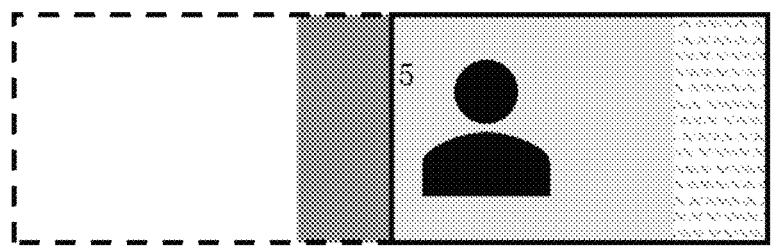
Fig. 7E

NETWORK DEVICE, SYSTEM AND METHOD FOR VIDEO CONTENT PROCESSING

This Application claims priority from Application 202111085474.7 filed on Sep. 16, 2021 in China. The entire contents of these applications are incorporated herein by reference in their entirety.

TECHNICAL FIELD

The present disclosure relates to video content processing, and more particularly, to network devices, systems, methods, computer-readable media, and computer program products for video content processing.

BACKGROUND ART

Various electronic devices with display functions, such as Internet TV, computers and mobile terminals, can acquire various data signals and perform live or on-demand broadcast of video content. With the development of video playback technology, users' demand for interaction is increasing day by day, and their requirements for playback performance and interactive experience are becoming higher and higher.

SUMMARY OF THE INVENTION

The present disclosure relates to network devices, systems, methods, computer readable media, and computer program products for video content processing.

Some aspects of the present disclosure relate to a network device including a memory and a processor. The memory has instructions stored thereon; and the processor is configured to execute instructions stored on the memory to cause the network device to perform the following operations: obtaining a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into continuous N picture units in the horizontal direction, each picture unit is used for playing the corresponding video stream segments, and the time from the left edge of the first frame of the corresponding video stream segment entering the picture unit from the right side of the picture unit to the left edge of the kth frame leaving the picture unit from the left side of the picture unit is T; decoding the main video by the main decoder of the network device; decoding video stream segments corresponding to odd-numbered picture units by a first sub-decoder of the network device, and decoding video stream segments corresponding to even-numbered picture units by a second sub-decoder of the network device; and playing the main video and the plurality of video stream segments.

In some embodiments, for the above-mentioned network device, the joint division of the video bullet screen in time and space further comprises: dividing the time into (N+1)*K sub-times by frame in the time direction, with each sub-time corresponding to a plurality of subspaces; dividing the space into N subspaces by picture unit in the spatial direction; allocating the 1/K part from the left of the first frame of the video bullet screen to the 1/K part from the right of the first subspace of the sub-time corresponding to the first frame; allocating the 2/K part from the left of the second frame of the video bullet screen to the 2/K part from the right of the first subspace of the sub-time corresponding to the second frame; and allocating the corresponding parts of the subsequent frames of the video bullet screen to at least one corresponding part of at least one corresponding subspace of the sub-time corresponding to the subsequent frames.

In some embodiments, for the above-mentioned network device, the joint division of the video bullet screen in time and space further comprises: filling pixels with Alpha channel value of 0 at the positions of the original pixels where the video bullet screen does not exist, wherein an Alpha channel value indicates transparency of a pixel, and further configuring the processor to execute instructions stored on the memory to make the network device perform the following operations: mixing the transparency of the main video with the transparency of the plurality of video stream segments, so that only the pixels at the corresponding positions of the main video are displayed at the positions where the Alpha channel value is 0 in the plurality of video stream segments during playing.

In some embodiments, for the above-mentioned network device, the plurality of video stream segments are the first plurality of video stream segments, the video bullet screen is the first video bullet screen, and the continuous N picture units are the first N picture units, the processor is further configured to execute instructions stored on the memory to make the network device perform the following operations: obtaining a second plurality of video stream segments, wherein the second plurality of video stream segments are generated by pre-processing the second video bullet screen by a server, and the pre-processing comprises jointly dividing the second video bullet screen in time and space so that the second plurality of video stream segments continuously translate in space by frame with time, the second area of the screen for playing the second plurality of video stream segments is divided into second N continuous picture units in the horizontal direction, each picture unit in the second plurality of picture units is used for playing the corresponding video stream segments in the second plurality of video stream segments, and the time from the left edge of the first frame of the corresponding video stream segment entering the picture unit from the right side of the picture unit to the left edge of the kth frame leaving the picture unit from the left side of the picture unit is T; decoding video stream segments corresponding to odd-numbered picture units in the second plurality of picture units by a third sub-decoder of the network device, and decoding video stream segments corresponding to even-numbered picture units in the second plurality of picture units by a fourth sub-decoder of the network device; and playing the main video, the first plurality of video stream segments and the second plurality of video stream segments.

In some embodiments, for the above-mentioned network device, when the time of the video bullet screen is less than (N+1)*T, the preprocessing further comprises repeating the video bullet screen to reach the time of (N+1)*T; or when the time of the video bullet screen is greater than (N+1)*T, the preprocessing further comprises intercepting the first (N+1)*T time part of the video bullet screen.

In some embodiments, for the above-mentioned network device, the video bullet screen includes at least one of the following: videos generated by local users or other users using their respective clients and uploaded to the server and/or preconfigured videos; and the main video includes at least one of the following: videos of cable TV, terrestrial digital multimedia broadcasting, satellite communication TV obtained via cable and/or through Internet Protocol (IP).

Other aspects of the present disclosure relate to a network device including a memory and a processor. The memory has instructions stored thereon; and the processor is configured to execute instructions stored on the memory to cause the network device to perform the following operations: obtaining a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into N continuous picture units in the horizontal direction and sequentially numbered as 1, 2, . . . , N, each picture unit is used for playing the corresponding video stream segments, and the time from the left edge of the first frame of the corresponding video stream segment entering the picture unit from the right side of the picture unit to the left edge of the kth frame leaving the picture unit from the left side of the picture unit is T; decoding the main video by a main decoder of the network device; a first sub-decoder of network device decodes video stream segments corresponding to the picture units numbered mod 3=1 among the N picture units, a second sub-decoder of network device decodes video stream segments corresponding to the picture units numbered mode 3=2 among the N picture units, and a third sub-decoder of the network device decodes video stream segments corresponding to the picture units numbered mod 3=0 among the N picture units; and playing the main video and the plurality of video stream segments.

Other aspects of the present disclosure relate to a system for video content processing, including a server and a network device. The server includes a memory having instructions stored thereon; and a processor configured to execute instructions stored on the memory to cause the server to perform the following operations: acquiring the video bullet screen; and pre-processing the video bullet screen to generate a plurality of video stream segments, wherein the pre-processing comprises jointly dividing the video bullet screen in time and space so that the plurality of video stream segments continuously translate in space according to frames with time, the area of the screen used for playing the plurality of video stream segments is divided into continuous N picture units in the horizontal direction, each picture unit is used for playing the corresponding video stream segments, and in each picture unit, the time from the left edge of the first frame of the corresponding video stream segment entering the picture unit from the right side to the left edge of the kth frame leaving the picture unit from the left side is T. The network device includes a memory having instructions stored thereon; and a processor configured to execute instructions stored on the memory to cause the network device to perform the following operations: acquiring a main video and the plurality of video stream segments; decoding the main video by a main decoder of the network device; decoding video stream segments corresponding to odd-numbered picture units by a first sub-decoder of the network device, and decoding video stream segments corresponding to even-numbered picture units by a second sub-decoder of the network device; and playing the main video and the plurality of video stream segments.

Other aspects of the present disclosure relate to a method performed by a network device, wherein the method comprises: obtaining a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into continuous N picture units in the horizontal direction, each picture unit is used for playing the corresponding video stream segments, and the time from the left edge of the first frame of the corresponding video stream segment entering the picture unit from the right side of the picture unit to the left edge of the kth frame leaving the picture unit from the left side of the picture unit is T; decoding the main video by a main decoder of the network device; decoding video stream segments corresponding to odd-numbered picture units by a first sub-decoder of the network device, and decoding video stream segments corresponding to even-numbered picture units by a second sub-decoder of the network device; and playing the main video and the plurality of video stream segments.

In some embodiments, in the above-mentioned method, the joint division of the video bullet screen in time and space further comprises: dividing the time into $(N+1)*K$ sub-times by frame in the time direction, with each sub-time corresponding to a plurality of subspaces; dividing the space into N subspaces by picture unit in the spatial direction; allocating the 1/K part from the left of the first frame of the video bullet screen to the 1/K part from the right of the first subspace of the sub-time corresponding to the first frame; allocating the 2/K part from the left of the second frame of the video bullet screen to the 2/K part from the right of the first subspace of the sub-time corresponding to the second frame; and allocating the corresponding parts of the subsequent frames of the video bullet screen to at least one corresponding part of at least one corresponding subspace of the sub-time corresponding to the subsequent frames.

In some embodiments, for the above-mentioned method, in which the joint division of the video bullet screen in time and space further includes filling pixels with transparency of 0 at the positions of the original pixels where the video bullet screen does not exist, the method further comprises: Mixing the transparency of the main video with the transparency of the plurality of video stream segments, so that only the pixels at the corresponding positions of the main video are displayed at the positions where the transparency is 0 in the plurality of video stream segments during playing.

In some embodiments, for the above-mentioned method, wherein the plurality of video stream segments are the first plurality of video stream segments, the video bullet screen is the first video bullet screen, and the continuous N picture units are the first N picture units, the method further comprises: obtaining a second plurality of video stream segments, wherein the second plurality of video stream segments are generated by pre-processing the second video bullet screen by a server, and the pre-processing comprises jointly dividing the second video bullet screen in time and space so that the second plurality of video stream segments continuously translate in space by frame with time, the second area of the screen for playing the second plurality of video stream segments is divided into second N continuous picture units in the horizontal direction, each picture unit in the second plurality of picture units is used for playing the corresponding video stream segments in the second plurality of video stream segments, and the time from the left edge of the first frame of the corresponding video stream segment entering the picture unit from the right side of the picture unit to the left edge of the kth frame leaving the picture unit from the left side of the picture unit is T; decoding video stream segments corresponding to odd-numbered picture units in the second plurality of picture units by a third sub-decoder of the network device, and decoding video stream segments corresponding to even-numbered picture units in the second plurality of picture units by a fourth sub-decoder of the network device; and playing the main video, the first plurality of video stream segments and the second plurality of video stream segments.

In some embodiments, for the above-mentioned method, when the time of the video bullet screen is less than (N+1)*T, the preprocessing further comprises repeating the video bullet screen to reach the time of (N+1)*T; or when the time of the video bullet screen is greater than (N+1)*T, the preprocessing further comprises intercepting the first (N+1)*T time part of the video bullet screen.

In some embodiments, for the above-mentioned method, wherein the video bullet screen includes at least one of the following: videos generated by local users or other users using their respective clients and uploaded to the server and/or preconfigured videos; and the main video includes at least one of the following: videos of cable TV, terrestrial digital multimedia broadcasting, satellite communication TV obtained via cable and/or through Internet Protocol (IP).

Other aspects of the present disclosure relate to a non-transitory computer-readable medium having instructions stored thereon that, when executed by a processor of a network device, cause the network device to perform the method described above.

Some other aspects of the present disclosure relate to a computer program product including instructions that, when executed by one or more processors, cause the execution of the method described above.

BRIEF DESCRIPTION OF THE ATTACHED DRAWINGS

In order to better understand the present disclosure and show how to implement, description will now be made by way of examples with reference to the accompanying drawings, noting that similar reference numerals refer to the corresponding parts throughout the drawings. In which:

FIGS. 6A-6E are exemplary diagrams showing frames of a video bullet screen;

FIGS. 7A-7E are exemplary diagrams showing frames of a preprocessed video bullet screen at a corresponding time according to an embodiment of the present disclosure;

SPECIFIC EMBODIMENTS

Figure 1:
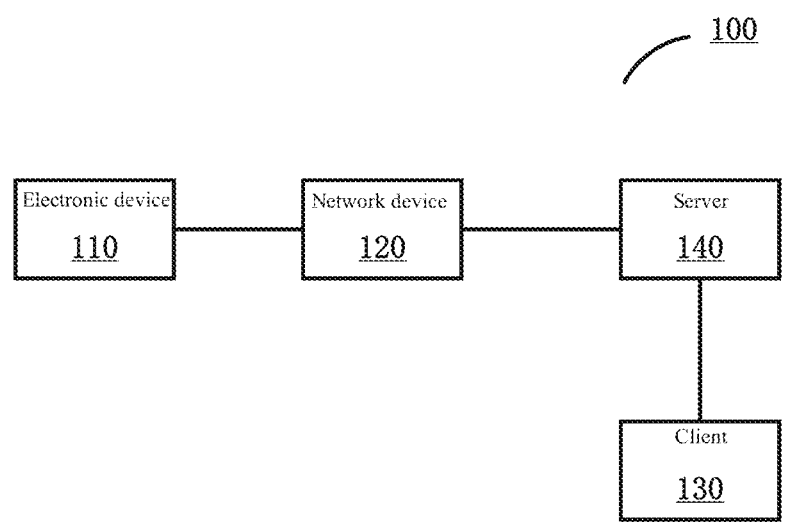
FIG. 1 is a schematic diagram showing an example system environment according to an embodiment of the present disclosure.

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is defined by the attached Claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

As mentioned earlier, with the development of video playback technology, users' demand for interaction is increasing day by day, and their requirements for playback performance and interactive experience are getting higher and higher.

A bullet screen is an evaluation caption that pops up when watching videos, which is very popular among content providers, especially in the East Asian cultural circle. The prior bullet screen forms include but are not limited to characters, emoticons and pictures. However, users may want, while watching the video content (hereinafter referred to as main video), to send and watch other forms of bullet screens, such as video bullet screen (hereinafter referred to as a "video bullet screen").

Compared with the prior bullet screen which can be displayed on the graphics layer, the video bullet screen is similar to the main video watched by the user and needs to be displayed on the video layer, so the display method of the prior bullet screen may not be suitable for the video bullet screen. Moreover, the video bullet screen also needs decoder to decode and output, so it is necessary to coordinate the decoding and output process of main video and video bullet screen. In addition, when the main video is played and the video bullet screen is also scrolled, the output position of the video needs to be changed constantly, and due to the bottleneck of software and/or hardware performance, this may cause bad effects such as jamming, jitter, smear or black screen.

Therefore, the present disclosure seeks to provide a richer bullet screen interactive experience by using network devices, electronic devices with display function, clients, servers and other devices. In the present disclosure, the video bullet screen is pre-processed to generate video stream segments that continuously translate in space with time; and the main video and the video stream segments corresponding to the corresponding space units of the screen are decoded by a plurality of decoders or a multi-channel decoder respectively, and played, so as to produce the effect that the video bullet screen can be continuously and horizontally played in space while the main video is played. The moving play of the video bullet screen on the screen is smooth and continuous. In addition, under the condition that the pre-processing can be performed by the server, the present disclosure can further reduce the computing overhead of network device or electronic display device, save software and hardware resources, and further avoid the adverse effects such as jamming, jitter, smear or black screen caused by the performance bottleneck of software and hardware. Therefore, the present disclosure can improve the user experience of the bullet screen in the form of video.

FIG. 1 is a schematic diagram showing an example system environment according to an embodiment of the present disclosure.

Referring to FIG. 1, an exemplary system environment may include an electronic device 110, a network device 120, a client 130, and a server 140. In some embodiments, the network device 120 (e.g., a set-top box) may receive various types of communications from the server 140 and/or send various types of communications to the electronic device 110 and the server 140. For example, the electronic device 110 may receive one or more data services, one or more audio/video services and/or other services from the server 140 through the network device 120. As another example, the network device 120 may receive a video bullet screen recorded by a local user and send it to the server 140. In addition, a plurality of other users can send their recorded video bullet screens to the server 140 through their own clients.

In some embodiments, the electronic device 110 may include various types of electronic devices with display function and screen, including but not limited to internet protocol television (IPTV) based on telecommunication private network, internet television based on public internet, network television, or various electronic display devices integrating the functions of playing and displaying video programs, TV programs or live programs, or it can be (or can be included in) a desktop computer, a laptop computer, a sub-notebook/netbook, a computer, a large tablet computer, a smart phone, a smart watch, a wearable device, a consumer electronic device, a portable computing device and/or any other electronic device with display function and screen. Note: The electronic device 110 of the present disclosure is not limited to the above examples.

The network device 120 may be various types of network devices connecting the electronic device 110 with external signal sources, and may be, for example, a device (e.g., a set-top box) or a module capable of converting the acquired signal into video content and displaying it on the screen of the electronic device 110. The STB can be a digital TV STB for receiving cable TV (DVB-C), a digital TV STB for receiving digital satellite TV (DVB-S), a digital TV STB for receiving terrestrial broadcast TV (DVB-T). In some embodiments, the network device 120 may be a device located outside the electronic device 110, or a module or function integrated in the electronic device 110. Note: The present disclosure does not specifically limit the type of the network device 120.

The client 130 may be a device used by a user to input a video bullet screen or record a video bullet screen. When a user wants to send a video bullet screen, the user can input a preconfigured video through his client or record a video bullet screen using his client. The client 130 can send the video bullet screen input by the user to the server 140 for storage or processing. The client 130 may be (or may be including) a desktop computer, a laptop computer, a sub-notebook/netbook, a computer, a large tablet computer, a smart phone, a smart watch, a wearable device, a consumer electronic device, a portable computing device and/or any other device with video input or video recording function.

The server 140 may be an operator network, the Internet, etc. According to an embodiment of the present disclosure, the server 140 may store, process and provide video/audio content to be played on the electronic device 110, metadata about the played content, and the like. In addition, the video bullet screen input by a user may be sent to the server 140 for storage and processing. Note: The present disclosure does not specifically limit the type of the server 140.

Figure 2:
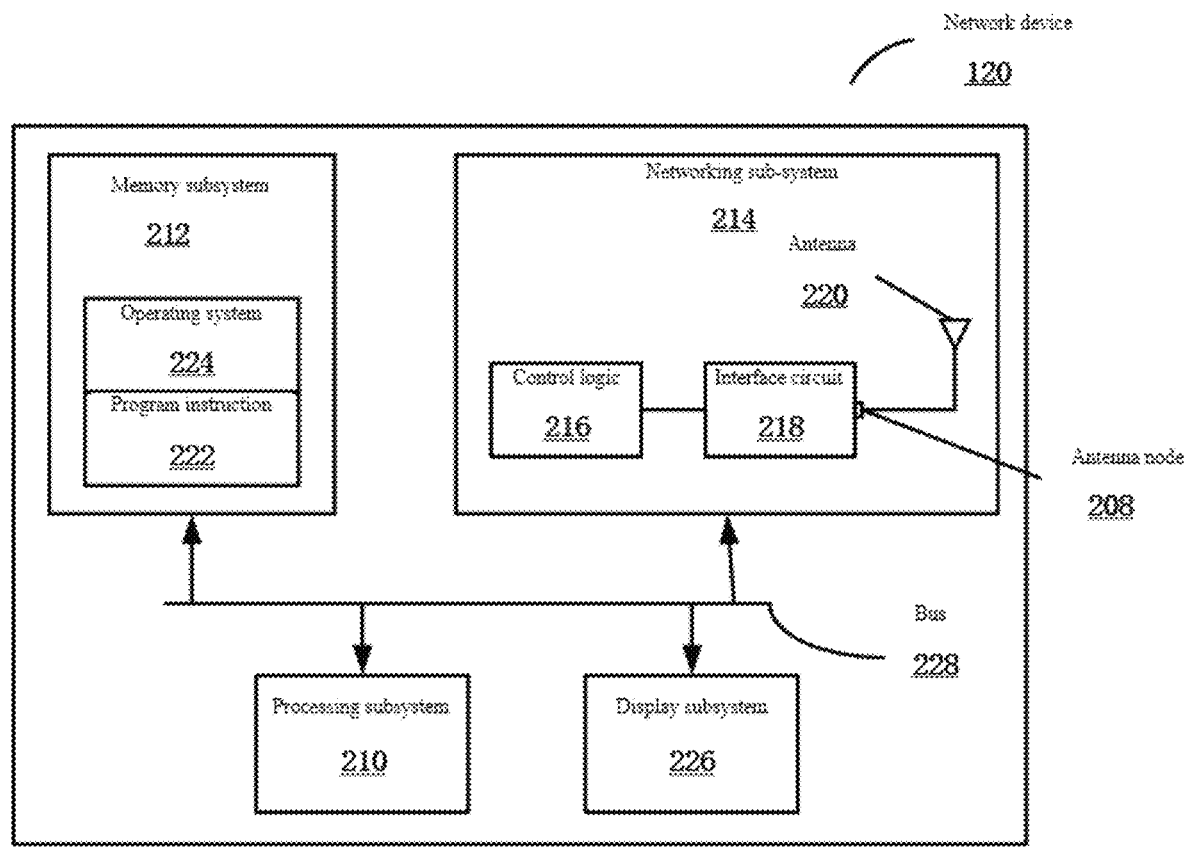
FIG. 2 is a schematic diagram showing a network device according to an embodiment of the present disclosure.

Now, with reference to FIG. 2, we will describe an embodiment of a network device (referred to herein as a first network device 120), which can perform at least some operations according to the embodiments of the present disclosure in communication technology. The network device 120 may comprise a processing subsystem 210, a memory subsystem 212, and a networking subsystem 214.

The processing subsystem 210 comprises one or a plurality of devices configured to perform computing operations. The processing subsystem 210 provides various functions of the network device 120. In some embodiments, the processing subsystem 210 is configured to perform operations for video content processing. For example, the processing subsystem 210 may comprise one or a plurality of microprocessors, ASICs, microcontrollers, programmable logic devices, Graphic Processing Units (GPU), and/or one or a plurality of Digital Signal Processors (DSP). The processing subsystem 210 may execute various program instructions stored in the memory subsystem 212 to perform corresponding operations, e.g., execute various program instructions to implement the method shown in FIG. 9 or other methods of the embodiments of the present disclosure.

The memory subsystem 212 comprises one or a plurality of devices for storing data and/or instructions used for the processing subsystem 210 and the networking subsystem 214. For example, the memory subsystem 212 may comprise a dynamic random-access memory (DRAM), a static random-access memory (SRAM), and/or other types of memory (sometimes collectively or individually referred to as "computer-readable storage medium"). In some embodiments, the instructions used in the memory subsystem 212 of the processing subsystem 210 comprise: one or a plurality of program modules or instruction sets (for example, a program instruction 222 or an operating system 224), which can be executed by the processing subsystem 210. It should be noted that one or a plurality of computer programs may constitute a computer program mechanism. In addition, an instruction in the various modules of the memory subsystem 212 may be implemented by the following: advanced programming languages, object-oriented programming languages and/or assembly or machine languages. Moreover, the programming language may be compiled or interpreted, e.g., as configurable or configured (used interchangeably in this discussion), for executing by the processing subsystem 210 to realize the functions of the present disclosure.

In addition, the memory subsystem 212 may comprise mechanism for controlling access to memory. In some embodiments, the memory subsystem 212 comprises a memory hierarchy, and the memory hierarchy comprises one or a plurality of high-speed caches coupled to the memory in the first network device 120. In some of these embodiments, one or a plurality of the high-speed caches are located in the processing subsystem 210.

In some embodiments, the memory subsystem 212 is coupled to one or a plurality of high-capacity mass storage devices (not shown). For example, the memory subsystem 212 may be coupled to a magnetic or optical driver, a solid-state driver, or another type of mass storage device. In these embodiments, the network device 120 may use the memory subsystem 212 as a fast-access storage of frequently used data, while the mass storage device may be used to store infrequently used data.

The networking subsystem 214 comprises one or a plurality of devices configured to be coupled to a wired and/or wireless network and to communicate over the wired and/or wireless network (i.e., to perform network operations), including: control logic 216, an interface circuit 218, and one or a plurality of antennas 220 (or antenna elements). (Although FIG. 2 includes one or a plurality of antennas 220, in some embodiments, the network device 120 comprises one or a plurality of nodes that can be coupled to one or a plurality of antennas 220, such as node 208. Therefore, the electronic device 120 may include or not include one or a plurality of antennas 220.) For example, the networking subsystem 214 may comprise a Bluetooth networking system, a cellular networking system (for example, 3G/4G/5G networks, such as UMTS and LTE), a USB networking system, a networking system based on standards described in IEEE 802.11 (for example, Wi-Fi networking system), Ethernet networking system, and/or another networking system.

Within the network device 120, the processing subsystem 210, memory subsystem 212 and networking subsystem 214 are coupled together using bus 228. The bus 228 may comprise electrical, optical, and/or electro-optical connections of the subsystems through which commands, data and the like may be transmitted. Although only one bus 228 is shown for clarity, different embodiments may comprise different numbers or configurations of electrical, optical, and/or electro-optical connections in the subsystems.

In some embodiments, the network device 120 comprises a display subsystem 226 for displaying information on a display device, which may comprise a display driver and a display, such as a liquid crystal display and a multi-touch screen, etc.

The network device 120 may be (or may be included in) any electronic device having at least one network interface capable of connecting the electronic device 110 with an external signal source. For example, the network device 120 may be (or may be included in): an STB, an on-board box, an integrated box, a smart box, a smart TV, an Internet TV, a desktop computer, a laptop computer, a sub-notebook/netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a router, a switch, a communication device, a test device, and/or other electronic devices.

Although specific components are used to describe the network device 120, in alternative embodiments, different components and/or subsystems may exist in the network device 120. For example, the network device 120 may comprise one or a plurality of additional processing subsystems, memory subsystems, networking subsystems, and/or display subsystems. In addition, the network device 120 may not have one or a plurality of the subsystems. Furthermore, in some embodiments, the network device 120 may include one or more additional subsystems not shown in FIG. 2. Also, although separate subsystems are shown in FIG. 2, in some embodiments, some or all of the given subsystems or components may be integrated into one or a plurality of the other subsystems or components in the network device 120. For example, in some embodiments, the program instruction 222 is incorporated in the operating system 224, and/or the control logic 216 is incorporated in the interface circuit 218.

Although Wi-Fi and/or Ethernet communication protocols are used in the above discussion as illustrative examples, in other embodiments, various communication protocols may be used, and more generally, communication technologies may be used. Therefore, communication technologies can be used in various network interfaces. In addition, although some operations in the aforementioned embodiments are implemented by hardware or software, in general, the operations in the aforementioned embodiments may be implemented in various configurations and frameworks. Therefore, some or all of the operations in the aforementioned embodiments may be implemented by hardware, software, or both. For example, at least some operations in the communication technology can be implemented using the program instruction 222, the operating system 224 (e.g., a driver for the interface circuit 218), or firmware in the interface circuit 218. Alternatively or in addition, at least some operations in the communication technology may be implemented at physical layer, e.g., hardware in the interface circuit 218.

The process of displaying video content on the screen and the scrolling playing process of video bullets on the screen will be explained with reference to FIGS. 3 and 4.

Figure 3:
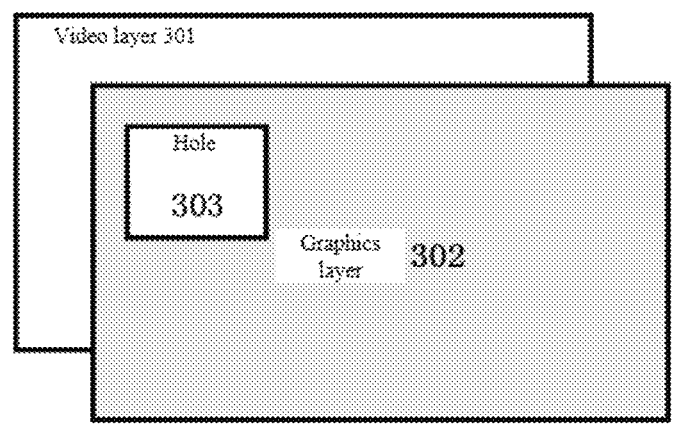
FIG. 3 is a schematic diagram showing a hierarchical structure of a display module of an electronic device.
Figure 4:
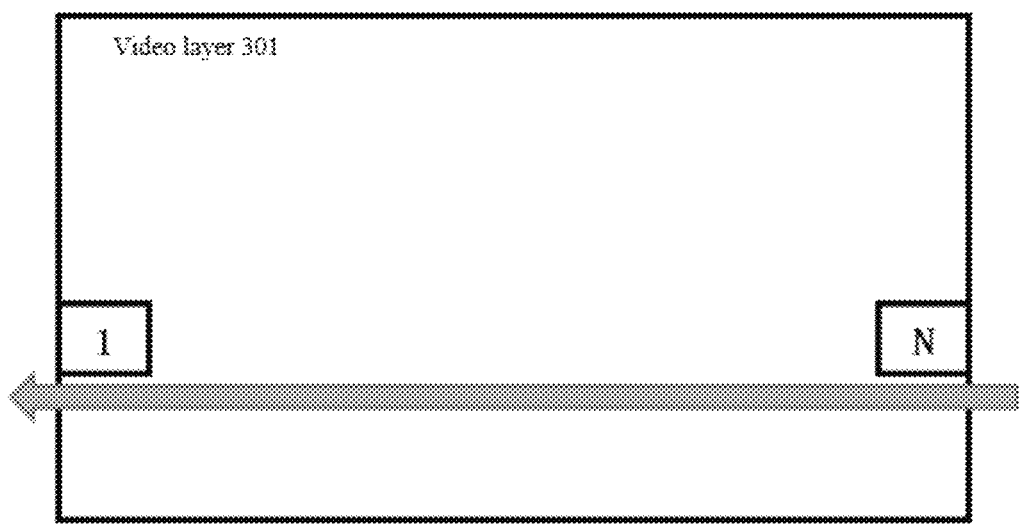
FIG. 4 is a schematic diagram showing the movement of a video bullet screen.

FIG. 3 is a schematic diagram showing a hierarchical structure of a display module of an electronic device. As shown in FIG. 3, the hierarchic structure of a common display module includes a video layer 301 and a graphics layer 302 superimposed on the video layer 301.

The video layer 301 is below the graphics layer 302, and is used to display the video content output by the decoder. The graphics layer 302 is superimposed on the video layer, and is used to display graphical contents such as user interface (UI) and web page. A special hole area is set in the graphics layer 302, and the transparency (Alpha channel value) of pixels in the hole area is all 0, so that when the graphics content in this area is mixed with the video content of the lower layer, only the video content of the lower layer can be displayed, thereby achieving the effect of transparent video display. Similarly, by adjusting the transparency of pixels in any area of the graphics layer 302, the effects of full covering, half covering or no covering can be achieved for the video content of the lower layer.

The video bullet screen involved in the present disclosure is similar to the main video watched by the user and needs to be displayed on the video layer 301. FIG. 4 is a schematic diagram showing the movement of a video bullet screen. In the full screen projection mode, the video bullet screen can enter from the right side of the screen (for example, area N), and be played while moving in the arrow direction until it disappears from the left side of the screen (for example, area 1).

In some instances, when the main video and the video bullet screen come from different data sources and cannot be mixed and coded at the source, in order to play the main video while rolling the video bullet screen, the main video needs to occupy one-channel decoder, and the video bullet screen also needs to occupy one-channel decoder. Then, by changing the value of the horizontal axis (X axis) in the display position of the video bullet screen continuously with time, the effect of rolling the video bullet screen is achieved.

In this process, the decoding of the decoder and output display can be carried out by hardware, but the scrolling of the video bullet screen from right to left is realized by constantly changing the display position of the video bullet screen by software, and due to the bottleneck of software and/or hardware performance, this may cause bad effects such as jamming, jitter, smear or black screen.

Therefore, in the present disclosure, the video bullet screen is preprocessed, so as to generate video stream segments that continuously translate in space with time; and the main video and the video stream segments corresponding to the corresponding space units of the screen are decoded and played by a plurality of decoders or a multi-channel decoder respectively, thereby generating the effect that the video bullet screen can be continuously and horizontally played in space while the main video is played, and further improving the user viewing experience of the video bullet screen.

Figure 5:
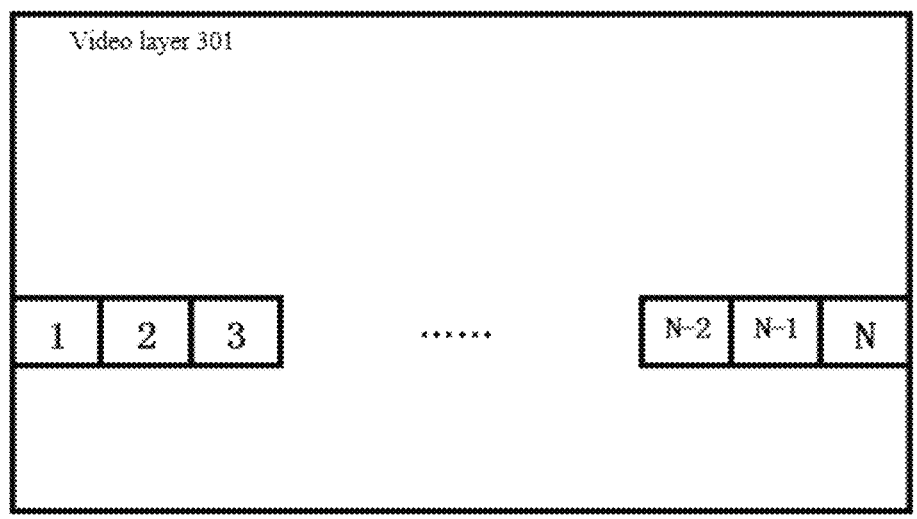
FIG. 5 is a schematic diagram showing a screen for playing a video bullet screen according to an embodiment of the present disclosure.
Figure 8:
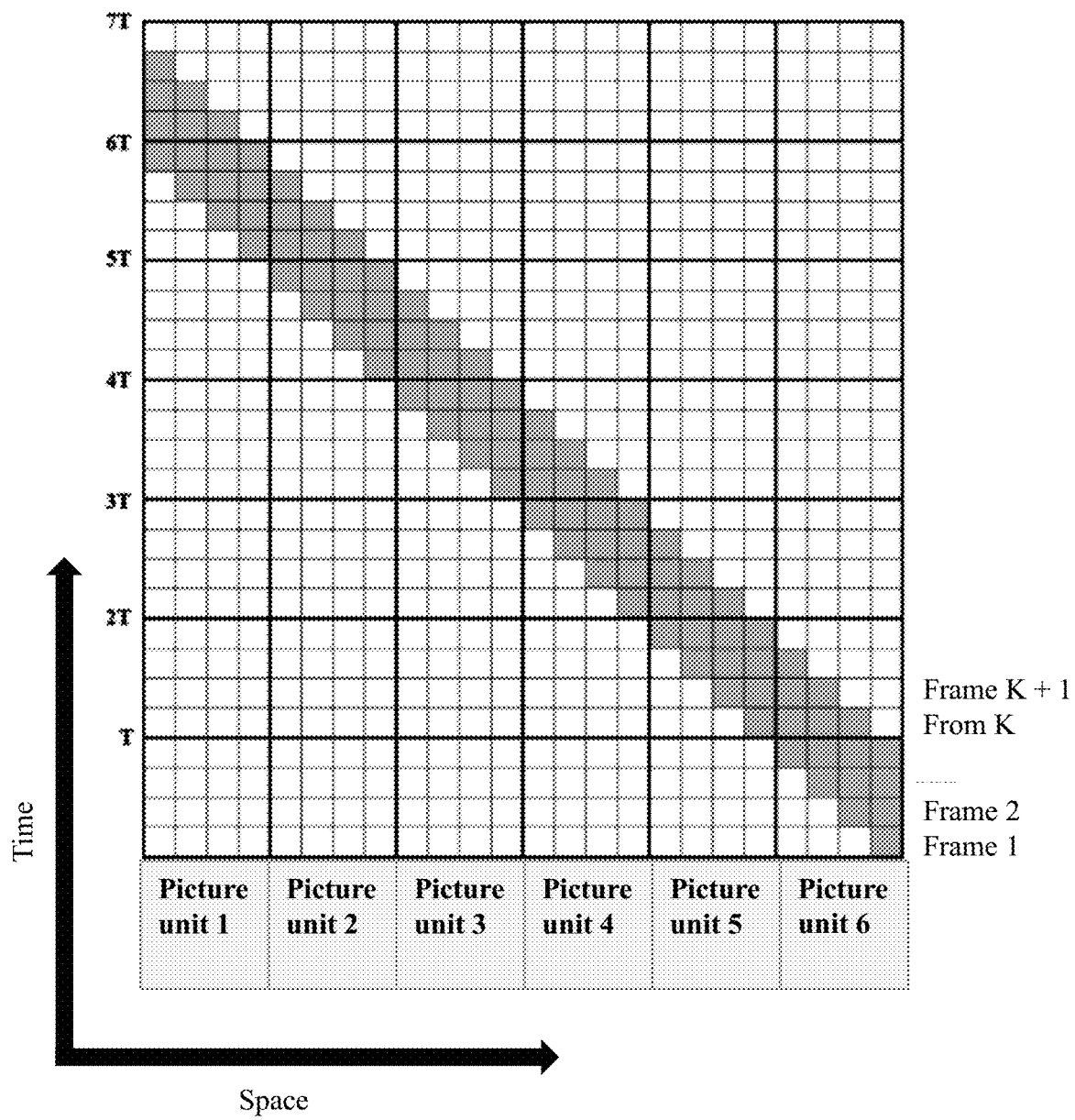
FIG. 8 is an exemplary diagram showing joint division of a video bullet screen in time and space according to an embodiment of the present disclosure.
Figure 9:
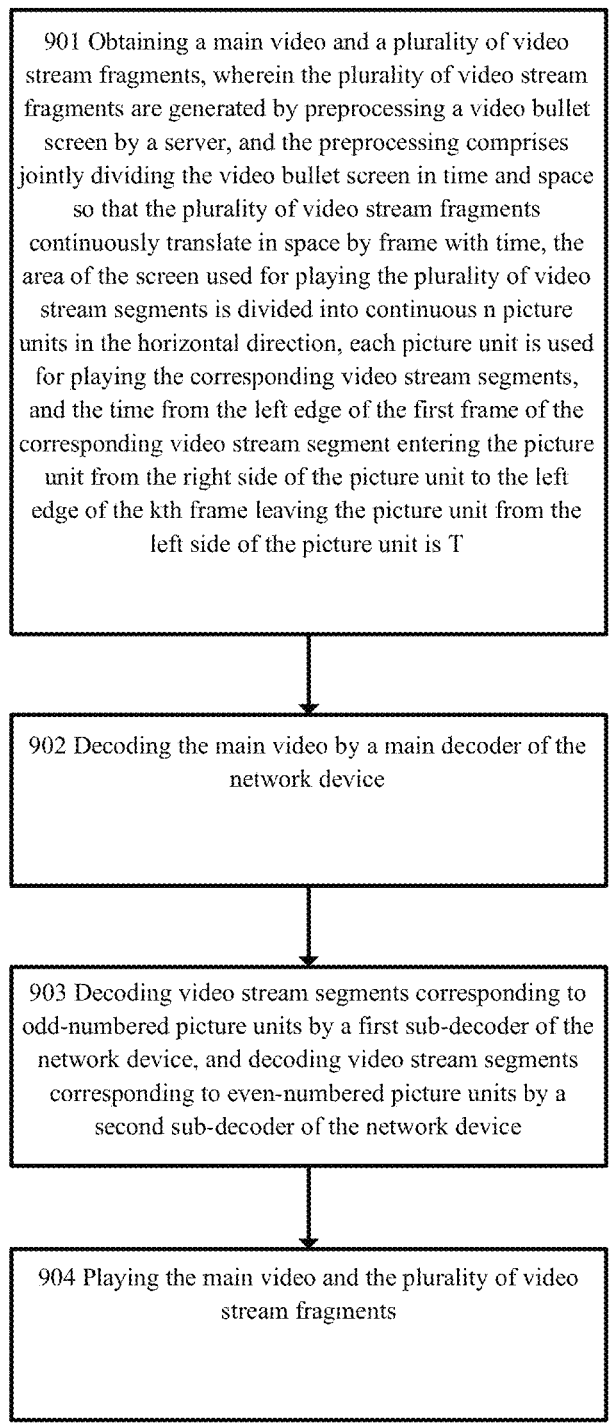
FIG. 9 is a schematic diagram of an exemplary method performed by the network device according to an embodiment of the present disclosure.

The method of processing a video bullet screen according to an embodiment of the present disclosure will be described below with reference to FIGS. 5-9. This method preprocesses the video bullet screen, so as to generate video stream segments (refer to FIGS. 6A-6E, FIGS. 7A-7E and FIG. 8) which continuously translate in space with time, and the main video and video stream segments corresponding to the corresponding space units of the screen (refer to FIG. 5) are respectively decoded by the multi-channel decoder and played in the corresponding space units of the screen. FIG. 5 is a schematic diagram showing a screen for playing a video bullet screen according to an embodiment of the present disclosure; FIGS. 6A-6E are exemplary diagrams showing frames of a video bullet screen; FIGS. 7A-7E are exemplary diagrams showing respective frames of a preprocessed video bullet screen at corresponding time moments according to an embodiment of the present disclosure; FIG. 8 is an exemplary diagram showing joint division of video bullet screen in time and space according to an embodiment of the present disclosure; FIG. 9 is a schematic diagram of an exemplary method 900 performed by a network device according to an embodiment of the present disclosure.

Referring to FIG. 9, the method 900 can be performed by the network device 120 shown in FIG. 1, network device 120 connects the electronic device 110 with an external signal source (or server 140) and converts the acquired signal into corresponding video content and display it on the electronic device 110.

The method 900 may include, in operation step 901, acquiring a main video and a plurality of video stream segments. The multiple video stream segments are generated based on preprocessing the video bullet screen, which includes jointly dividing the video bullet screen in time and space so that the multiple video stream segments continuously translate in space by frame over time. That is to say, the video bullet screen is re-encoded into a plurality of video stream segments continuously translated in space, and each video stream segment corresponds to the corresponding space where the video stream segment is to be played. In some embodiments, the preprocessing may be performed by the server 140; in other embodiments, the preprocessing may also be performed by the network device 120.

The main video in operation step 901 may be or may include at least one of the following: videos of cable TV, terrestrial digital multimedia broadcasting, satellite communication TV obtained via cable and/or through Internet Protocol (IP). The video bullet screen may be or may include at least one of the following: videos and/or preconfigured videos generated by local users or other users using their respective clients (for example, the client 130) and uploaded to the server 140. The main video and video bullet screen can come from different data sources. The video bullet screen uploaded to the server can be reviewed first, and can only be used for playing after passing the review. Note: The present disclosure does not specifically limit the type of main video and the number and type of video bullet screen.

The preprocessing operation will be further explained with reference to FIGS. 5-8.

First, refer to FIG. 5, in which the area of the screen for playing the plurality of video stream segments is divided into continuous N picture units in the horizontal direction (for example, picture units 1, 2, ..., N in FIG. 5, hereinafter also referred to as first picture unit, second picture unit ... Nth picture unit (or Nth picture unit, picture unit numbered N, etc.). The relative position of each picture unit is fixed relative to the whole screen picture, and is used for playing the video stream segment corresponding to the picture unit.

In addition, it is assumed that the video bullet screen moves from right to left at a fixed speed, and the time from the left edge of the first frame of the corresponding video stream segment entering the picture unit from the right side of the picture unit to the left edge of the kth frame leaving the picture unit from the left side of the picture unit is T, that is to say, it is assumed that the time when the video bullet screen moves through a picture unit is T and k frames are played during this time T.

The joint division of video bullet screen in time and space is to be described as follows. FIGS. 6A-6E show exemplary schematic diagrams of frames of the video bullet screen. Here, we assume that FIGS. 6A-6E are the first frame to the fifth frame of the video bullet screen, respectively. Different numbers are used in the figure to indicate that the video bullet screen is dynamic, that is, each frame image is different. Then, preprocessing the video bullet screen into a plurality of video stream segments which continuously translate in space by frame over time can be decomposed into the following operations: dividing the time into (N+1)*K sub-times by frame in the time direction (refer to the time axis of FIG. 8, which is drawn with N=6 and K=4), and each sub-time corresponds to multiple subspaces (i.e., each row corresponds to multiple column units in FIG. 8); in the spatial direction, dividing the space into N subspaces by picture unit (refer to the spatial axis of FIG. 8); allocating the 1/K part from the left of the first frame of the video bullet screen to the 1/K part from the right of the first subspace of the sub-time corresponding to the first frame (refer to the gray part in the sixth picture unit of the first row from the time axis in FIG. 8); allocating the 2/K part from the left of the second frame of the video bullet screen to the 2/K part from the right of the first subspace of the sub-time corresponding to the second frame (refer to the gray part in the sixth picture unit of the second row from the time axis in FIG. 8); by analogy, allocating the corresponding parts of the subsequent frames of the video bullet screen to at least one corresponding part of at least one corresponding subspace of the sub-time corresponding to such subsequent frame (refer to the gray part of the remaining rows of FIG. 8).

Taking N=6 and K=4 as examples, the results of the joint division operation will be explained in detail with reference to FIGS. 7A-7E. Take the video stream segment corresponding to the nth picture unit as an example: at time moment T/4, the ¼ part from the right of the Nth picture unit should be played to the ¼ from the left of the first frame of the video bullet screen (refer to the first row from the bottom of the time axis in FIG. 7A or FIG. 8); at time moment T/2, the ½ part from the right of the Nth picture unit should be played till the ½ part from the left of the second frame of the video bullet screen (refer to the second row from the bottom of the time axis in FIG. 7B or FIG. 8); at time moment 3T/4, the ¾ part from the right of the Nth picture unit should be played to the ¾ part from the left of the third frame of the video bullet screen (refer to the third row from the bottom of the time axis in FIG. 7C or FIG. 8); at time moment T, the whole part of the Nth picture unit should be played to the whole part of the fourth frame of the video bullet screen (refer to the fourth row from the bottom of the time axis in FIG. 7D or FIG. 8); at time moment 5T/4, the left ¾ part of the Nth picture unit should be played to the right ¾ part of the fifth frame of the video bullet screen, and the ¼ part from the right of the N−1th picture unit should be played to the ¼ part from the left of the fifth frame of the video bullet screen (refer to FIG. 7E or FIG. 8 for the fifth row from the bottom); and so on (see the remaining rows of FIG. 8). Note: The positions of the original pixels where the video bullet screen does not exist are filled with pixels with transparency of 0, as shown in the diagonal line area of FIGS. 7A-7E. In addition, in FIGS. 7A-7E, the area surrounded by the black solid frame represents the current corresponding picture unit (for example, the Nth picture unit), the area surrounded by the dashed frame represents the adjacent picture unit (for example, the (N−1th) picture unit, and the darker gray area outside the black solid frame represents the discarded data for the current picture unit. Thus, the video bullet screen is preprocessed into a plurality of video stream segments (for example, frames of the video bullet screen shown in FIGS. 6A-6E are preprocessed into the corresponding frames in the video stream segments shown in FIGS. 7A-7E).

Through the above preprocessing operation, the video bullet screen is re-encoded into a plurality of video stream segments corresponding to corresponding picture units. For example, referring to FIG. 8, the video stream segment (called segment 1) corresponding to the first picture unit is data located in the first picture unit area on the 5T-7T spatial axis on the time axis. The video stream segment corresponding to the second picture unit (called segment 2) is data located in the second picture unit area on the 4T-6T spatial axis on the time axis . . . . The video stream segment corresponding to the sixth picture unit (called segment 6) is data located in the sixth picture unit area on the 0-2T spatial axis on the time axis. These video stream segments include relevant temporal and spatial metadata.

According to the above description, it can be seen that the total playing time of the bullet screen on the screen is (N+1)*T. In some embodiments, when the time of the video bullet screen is less than (N+1)*T, the above preprocessing further includes repeating the video bullet screen to reach the time of (N+1)*T; and when the time of the video bullet screen is greater than (N+1)*T, the preprocessing also includes intercepting the first (N+1)*T time part of the video bullet screen or compressing the video bullet screen into (N+1)*T time length.

Referring back to FIG. 9, the method 900 further includes decoding the main video by the main decoder of the network device 120 in operation step 902. The network device 120 may have a decoder integrated by multiple decoders, or may have multiple-channel decoders, one of which is used to decode the main video.

The method 900 further includes, in operation step 903, decoding video stream segments corresponding to odd-numbered picture units by a first sub-decoder of the network device, and decoding video stream segments corresponding to even-numbered picture units by a second sub-decoder of the network device.

Referring to FIG. 8, for example, the video stream segments corresponding to the first, third and fifth picture units can be decoded by the first sub-decoder of the network device, and the video stream segments corresponding to the second, fourth and sixth picture units can be decoded by the second sub-decoder of the network device.

Referring continuously to FIG. 9, the method 900 further includes playing the main video and the plurality of video stream segments in operation step 904. The decoding and playing in operation steps 902-904 are not separate or must be sequential, and decoding may be made while playing, that is, the decoding and playing of frames is almost real-time.

Because each video stream segment contains temporal and spatial metadata, the video stream segments can be accurately played in the corresponding picture units. As two decoders are used to decode data of N picture units, video frames spanning two adjacent picture units can be displayed jointly.

Table 1 shows the playing of video bullet screen with N=6.

TABLE 1

| TIME moment | VIDEO bullet screen position | Playback control | Decoding |
|---|---|---|---|
| 0 | Enter the sixth picture unit (enter the screen) | Start the play of the segment 6 in the sixth picture unit | Segment 6 |
| T | Enter the fifth picture unit | Start the play of the segment 5 in the fifth picture unit | Segments 6 and 5 |
| 2T | Enter the fourth picture unit and leave the sixth picture unit | Start the play of the segment 4 in the fourth picture unit, and stop playing the sixth picture unit | Segments 5 and 4 |
| 3T | Enter the third picture unit and leave the fifth picture unit | Start the play of the segment 3 in the third picture unit, and stop playing the fifth picture unit | Segments 4 and 3 |
| 4T | Enter the second picture unit and leave the fourth picture unit | Start the play of the segment 2 in the second picture unit, and stop playing the fourth picture unit | SEGMENTS 3 and 2 |
| 5T | Enter the first picture unit and leave the third picture unit | Start the play of the segment 1 in the first picture unit, and stop playing the third picture unit | Segments 2 and 1 |
| 6T | Leave the second picture unit | Stop playing the second picture unit | Segment 1 |
| 7T | Leave the first picture unit (leave the screen) | Stop playing the first picture unit | None |

In some embodiments, when preprocessing the video bullet screen, pixels with transparency of 0 are also filled at the positions of the original pixels where the video bullet screen does not exist, the operation step 904 further includes mixing the transparency of the main video with that of the plurality of video stream segments, so that only pixels at corresponding positions of the main video are displayed at positions with transparency of 0 in the plurality of video stream segments during playing.

In some embodiments, a sliding window may be set on the graphics layer 302 to cover part of the pictures of two adjacent picture units below, so as to ensure that only the pictures with the original picture size of the video bullet screen are visible on the moving path of the video bullet screen. In this case, only one video stream segment needs to be generated, and each picture unit is played with the same video stream segment, but the playing time of each picture unit is different.

Besides, in the case of multiple video bullet screens, the present disclosure also includes generating a second plurality of video stream segments to be played at a second plurality of picture units based on the similar preprocessing described above; and decoding video streams segments corresponding to odd-numbered picture units in the second plurality of picture units by a third sub-decoder of the network device, and decoding video stream segments corresponding to even-numbered picture units in the second plurality of picture units by a fourth sub-decoder of the network device; and playing the main video and the plurality of video stream segments corresponding to the plurality of video bullet screens.

Each method of the embodiments of the present disclosure preprocesses the video bullet screen, so as to generate video stream segments that continuously translate in space with time; and the main video and the video stream segments corresponding to the corresponding space units of the screen are decoded by a plurality of decoders or a multi-channel decoder respectively and played, so as to produce the effect that the video bullet screen can be continuously and horizontally played in space while the main video is played. The moving play of the video bullet screen on the screen is smooth and continuous. In addition, under the condition that the pre-processing can be performed by the server, the present disclosure can further reduce the computational overhead of network device or electronic display device, save the consumption of local software and hardware resources, and further avoid the adverse effects such as jamming, jitter, smear or black screen caused by the performance bottleneck of software and hardware, thereby reducing the performance requirements of software and/or hardware for playing device, so that the video bullet screen can also be applicable to devices with lower performance. Therefore, the present disclosure can improve the user experience of the bullet screen in the form of video, and provide a richer bullet screen interactive experience.

The above method adopts a two-channel decoder to decode the video stream segments related to the video bullet screen. As the resource of each-channel decoder needs to be used to decode the next picture unit immediately after the decoding of the previous picture unit, e.g., the second sub-decoder should start decoding the data of the fourth picture unit immediately after decoding the data of the sixth picture unit at 2T, if there is a large time delay of resources in the process of spatial change, it may lead to various display problems.

In this regard, the present disclosure also relates to a method for decoding a plurality of video stream segments by using a three-channel decoder. This method is similar to the method 900, in which operation steps 901, 902 and 904 are similar, so they will not be repeated here. Compared with the method 900, in the operation step 903, the method is modified into decoding the video stream segments corresponding to picture units numbered mod 3=1 among N picture units by a first sub-detector of the network device, decoding the video stream segments corresponding to picture units numbered mod 3=2 among N picture units by a second sub-decoder of the network device, and decoding the video stream segments corresponding to picture units numbered mod 3=0 among N picture units by a third sub-decoder of the network device.

For example, referring to FIG. 8, video stream segments corresponding to the first and fourth picture units are decoded by the first sub-decoder of the network device, video stream segments corresponding to the second and fifth picture units are decoded by the second sub-decoder of the network device, and video stream segments corresponding to the third and sixth picture units are decoded by the third sub-decoder of the network device.

Using a three-channel decoder to decode a plurality of video stream segments can further avoid the display problem caused by resource allocation delay when the space changes at the expense of increasing one-channel decoder.

The present disclosure may be realized as any combination of devices, systems, integrated circuits, and computer programs on non-transient computer-readable media. One or a plurality of processors may be realized as an integrated circuit (IC), an application-specific integrated circuit (ASIC) or a large-scale integrated circuit (LSI), a system LSI, a super LSI, or an ultra LSI component that performs some or all of the functions described in the present disclosure.

The present disclosure includes the use of software, applications, computer programs, or algorithms. Software, application programs, computer programs or algorithms can be stored on a non-transient computer-readable medium, so that a computer with one or a plurality of processors can execute the aforementioned steps and the steps described in the attached drawings. For example, one or a plurality of memories store software or algorithms by executable instructions, and one or a plurality of processors can associate the execution of a set of instructions of the software or algorithms to provide monitoring in any number of wireless networks according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may comprise dynamic random access memory (DRAM), random access memory (RAM), read-only memory (ROM), electrically erasable programmable read-only memory (EEPROM), compact disk read-only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include Compact Discs (CDs), laser disks, optical disks, Digital Versatile Discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the above features, other features or modifications can be expected. It can be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations should be executed to realize the desired result. In some cases, multi-tasking and parallel processing can be advantageous.

The invention claimed is:

1. A network device for video content processing, comprising:
   a memory having instructions stored thereon;
   a processor configured to execute instructions stored on the memory to cause a network device to perform the following operations:
   obtaining a main video and a plurality of video stream segments, wherein the plurality of video stream segments are generated by preprocessing a video bullet screen by a server, and the preprocessing comprises jointly dividing the video bullet screen in time and space to cause the plurality of video stream segments continuously translate in space by frame over time, the area of the screen used for playing the plurality of video stream segments is divided into continuous N picture units in the horizontal direction, each picture unit is used for playing the corresponding video stream segments, and in each picture unit, the time from the left edge of the first frame of the corresponding video stream segment entering said picture unit from the right side of said picture unit to the left edge of the $K^{th}$ frame leaving said picture unit from the left side of said picture unit is T;
   decoding the main video by the main decoder of the network device;
   decoding video stream segments corresponding to odd-numbered picture units by a first sub-decoder of the network device, and decoding video stream segments corresponding to even-numbered picture units by a second sub-decoder of the network device; and
   playing the main video and the video stream segments.

2. The network device according to claim 1, wherein the joint division of the video bullet screen in time and space further comprises:
   dividing the time into (N+1)*K sub-times by frame in the time direction, with each sub-time corresponding to a plurality of subspaces;
   dividing the space into N subspaces by picture unit in the spatial direction;
   allocating the 1/K part from the left of the first frame of the video bullet screen to the 1/K part from the right of the first subspace of the sub-time corresponding to the first frame;
   allocating the 2/K part from the left of the second frame of the video bullet screen to the 2/K part from the right of the first subspace of the sub-time corresponding to the second frame; and
   allocating the corresponding parts of the subsequent frames of the video bullet screen to at least one corresponding part of at least one corresponding subspace of the sub-time corresponding to the subsequent frames.

3. The network device according to claim 1, wherein the joint division of the video bullet screen in time and space further comprises: filling pixels with Alpha channel value of 0 at the positions of the original pixels where the video bullet screen does not exist, wherein an Alpha channel value indicates transparency of a pixel, and further configuring the processor to execute instructions stored on the memory to make the network device perform the following operations:
   mixing the transparency of the main video with the transparency of the plurality of video stream segments, so that only the pixels at the corresponding positions of the main video are displayed at the positions where the Alpha channel value is 0 in the plurality of video stream segments during playing.

4. The network device according to claim 1, wherein the plurality of video stream segments are the first plurality of video stream segments, the video bullet screen is the first video bullet screen, and the continuous N picture units are the first N picture units, the processor is further configured to execute instructions stored on the memory to make the network device perform the following operations:
   obtaining a second plurality of video stream segments, wherein the second plurality of video stream segments are generated by pre-processing the second video bullet screen by a server, and the pre-processing comprises jointly dividing the second video bullet screen in time and space so that the second plurality of video stream segments continuously translate in space by frame with time, the second area of the screen for playing the second plurality of video stream segments is divided into second N continuous picture units in the horizontal direction, each picture unit in the second plurality of picture units is used for playing the corresponding video stream segments in the second plurality of video stream segments, and the time from the left edge of the first frame of the corresponding video stream segment entering the picture unit from the right side of the picture unit to the left edge of the kth frame leaving the picture unit from the left side of the picture unit is T;
   decoding video stream segments corresponding to odd-numbered picture units in the second plurality of picture units by a third sub-decoder of the network device, and decoding video stream segments corresponding to even-numbered picture units in the second plurality of picture units by a fourth sub-decoder of the network device; and
   playing the main video, the first plurality of video stream segments and the second plurality of video stream segments.

5. The network device according to claim 1, wherein
   when the time of the video bullet screen is less than (N+1)*T, the preprocessing further comprises repeating the video bullet screen to reach the time of (N+1)*T; or
   when the time of the video bullet screen is greater than (N+1)*T, the preprocessing further comprises intercepting the first (N+1)*T time part of the video bullet screen.

6. The network device according to claim 1, wherein
   the video bullet screen includes at least one of the following: videos generated by local users or other users using their respective clients and uploaded to the server and/or preconfigured videos; and
   the main video includes at least one of the following: videos of cable TV, terrestrial digital multimedia broadcasting, satellite communication TV obtained via cable and/or through Internet Protocol (IP).

7. A network device for video content processing, comprising:
   a memory having instructions stored thereon;

a processor configured to execute instructions stored on the memory to cause a network device to perform the following operations:

obtaining a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into continuous N picture units in the horizontal direction, each picture unit is used for playing the corresponding video stream segments, and the time from the left edge of the first frame of the corresponding video stream segment entering the picture unit from the right side of the picture unit to the left edge of the Kth frame leaving the picture unit from the left side of the picture unit is T;

decoding the main video by the main decoder of the network device;

a first sub-decoder of network device decodes video stream segments corresponding to every third picture unit beginning with a first picture unit among the N picture units, a second sub-decoder of network device decodes video stream segments corresponding to every third picture unit beginning with a second picture unit among the N picture units, and a third sub-decoder of the network device decodes video stream segments corresponding to every third picture unit beginning with a third picture unit among the N picture units; and playing the main video and the video stream segments.

8. A system for video content processing, comprising:

a server, which includes: a memory having instructions stored thereon; and a processor configured to execute instructions stored on the memory to cause the server to perform the following operations:

acquiring the video bullet screen; and pre-processing the video bullet screen to generate a plurality of video stream segments, wherein the pre-processing comprises jointly dividing the video bullet screen in time and space so that the plurality of video stream segments continuously translate in space according to frames with time, the area of the screen used for playing the plurality of video stream segments is divided into continuous N picture units in the horizontal direction, each picture unit is used for playing the corresponding video stream segments, and in each picture unit, the time from the left edge of the first frame of the corresponding video stream segment entering the picture unit from the right side to the left edge of the kth frame leaving the picture unit from the left side is T; and a network device, comprising a memory having instructions stored thereon; and a processor, configured to execute instructions stored on the memory to cause the network device to perform the following operations:

acquiring a main video and a plurality of video stream segments;

decoding the main video by the main decoder of the network device;

decoding video stream segments corresponding to odd-numbered picture units by a first sub-decoder of the network device, and decoding video stream segments corresponding to even-numbered picture units by a second sub-decoder of the network device; and playing the main video and the video stream segments.

9. A method executed by a network device, wherein the method comprises:

obtaining a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into continuous N picture units in the horizontal direction, each picture unit is used for playing the corresponding video stream segments, and the time from the left edge of the first frame of the corresponding video stream segment entering the picture unit from the right side of the picture unit to the left edge of the Kth frame leaving the picture unit from the left side of the picture unit is T;

decoding the main video by the main decoder of the network device;

decoding video stream segments corresponding to odd-numbered picture units by a first sub-decoder of the network device, and decoding video stream segments corresponding to even-numbered picture units by a second sub-decoder of the network device; and playing the main video and the video stream segments.

10. The method according to claim 9, wherein the joint division of the video bullet screen in time and space further comprises:

dividing the time into (N+1)*K sub-times by frame in the time direction, with each sub-time corresponding to a plurality of subspaces;

dividing the space into N subspaces by picture unit in the spatial direction;

allocating the 1/K part from the left of the first frame of the video bullet screen to the 1/K part from the right of the first subspace of the sub-time corresponding to the first frame;

allocating the 2/K part from the left of the second frame of the video bullet screen to the 2/K part from the right of the first subspace of the sub-time corresponding to the second frame; and allocating the corresponding parts of the subsequent frames of the video bullet screen to at least one corresponding part of at least one corresponding subspace of the sub-time corresponding to the subsequent frames.

11. The method according to claim 9, wherein the joint division of the video bullet screen in time and space further includes filling pixels with Alpha channel value of 0 at the positions of the original pixels where the video bullet screen does not exist, wherein an Alpha channel value indicates transparency of a pixel, the method further comprises:

mixing the transparency of the main video with the transparency of the plurality of video stream segments, so that only the pixels at the corresponding positions of the main video are displayed at the positions where the transparency is 0 in the plurality of video stream segments during playing.

12. The method according to claim 9, wherein the plurality of video stream segments are the first plurality of video stream segments, the video bullet screen is the first video bullet screen, and the continuous N picture units are the first N picture units, and the method further comprises:

obtaining a second plurality of video stream segments, wherein the second plurality of video stream segments are generated by pre-processing the second video bullet screen by a server, and the pre-processing comprises jointly dividing the second video bullet screen in time and space so that the second plurality of video stream segments continuously translate in space by frame with time, the second area of the screen for playing the second plurality of video stream segments is divided into second N continuous picture units in the horizontal direction, each picture unit in the second plurality of picture units is used for playing the corresponding video stream segments in the second plurality of video stream segments, and the time from the left edge of the first frame of the corresponding video stream segment entering the picture unit from the right side of the picture unit to the left edge of the kth frame leaving the picture unit from the left side of the picture unit is T;

decoding video stream segments corresponding to odd-numbered picture units in the second plurality of picture units by a third sub-decoder of the network device, and decoding video stream segments corresponding to even-numbered picture units in the second plurality of picture units by a fourth sub-decoder of the network device; and playing the main video, the first plurality of video stream segments and the second plurality of video stream segments.

13. The method according to claim 9, wherein,
when the time of the video bullet screen is less than (N+1)*T, the preprocessing further comprises repeating the video bullet screen to reach the time of (N+1)*T; or
when the time of the video bullet screen is greater than (N+1)*T, the preprocessing further comprises intercepting the first (N+1)*T time part of the video bullet screen.

14. The method according to claim 9, wherein,
the video bullet screen includes at least one of the following: videos generated by local users or other users using their respective clients and uploaded to the server and/or preconfigured videos; and
the main video includes at least one of the following: videos of cable TV, terrestrial digital multimedia broadcasting, satellite communication TV obtained via cable and/or through Internet Protocol (IP).

15. A non-transitory computer-readable medium having instructions stored thereon that, when executed by a processor of a network device, cause the network device to perform the following operations:
obtaining a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into continuous N picture units in the horizontal direction, each picture unit is used for playing the corresponding video stream segments, and the time from the left edge of the first frame of the corresponding video stream segment entering the picture unit from the right side of the picture unit to the left edge of the Kth frame leaving the picture unit from the left side of the picture unit is T;
decoding the main video by the main decoder of the network device;
decoding video stream segments corresponding to odd-numbered picture units by a first sub-decoder of the network device, and decoding video stream segments corresponding to even-numbered picture units by a second sub-decoder of the network device; and
playing the main video and the video stream segments.

16. The non-transitory computer-readable medium according to claim 15, wherein the joint division of the video bullet screen in time and space further comprises:
dividing the time into (N+1)*K sub-times by frame in the time direction, with each sub-time corresponding to a plurality of subspaces;
dividing the space into N subspaces by picture unit in the spatial direction;
allocating the 1/K part from the left of the first frame of the video bullet screen to the 1/K part from the right of the first subspace of the sub-time corresponding to the first frame;
allocating the 2/K part from the left of the second frame of the video bullet screen to the 2/K part from the right of the first subspace of the sub-time corresponding to the second frame; and
allocating the corresponding parts of the subsequent frames of the video bullet screen to at least one corresponding part of at least one corresponding subspace of the sub-time corresponding to the subsequent frames.

17. The non-transitory computer-readable medium according to claim 15, wherein the joint division of the video bullet screen in time and space further comprises includes filling pixels with Alpha channel value of 0 at the positions of the original pixels where the video bullet screen does not exist, wherein an Alpha channel value indicates transparency of a pixel, and the non-transitory computer-readable medium further includes instructions that, when executed by the processor of a network device, cause the network device to perform the following operations:
mixing the transparency of the main video with the transparency of the plurality of video stream segments, so that only the pixels at the corresponding positions of the main video are displayed at the positions where the Alpha channel value is 0 in the plurality of video stream segments during playing.

18. The non-transitory computer-readable medium according to claim 15, wherein the plurality of video stream segments are the first plurality of video stream segments, the video bullet screen is the first video bullet screen, and the continuous N picture units are the first N picture units, and the non-transitory computer-readable medium further includes instructions that, when executed by the processor of a network device, cause the network device to perform the following operations:
obtaining a second plurality of video stream segments, wherein the second plurality of video stream segments are generated by pre-processing the second video bullet screen by a server, and the pre-processing comprises jointly dividing the second video bullet screen in time and space so that the second plurality of video stream segments continuously translate in space by frame with time, the second area of the screen for playing the second plurality of video stream segments is divided into second N continuous picture units in the horizontal direction, each picture unit in the second plurality of picture units is used for playing the corresponding video stream segments in the second plurality of video stream segments, and the time from the left edge of the first frame of the corresponding video stream segment entering the picture unit from the right side of the picture unit to the left edge of the kth frame leaving the picture unit from the left side of the picture unit is T;

decoding video stream segments corresponding to odd-numbered picture units in the second plurality of picture units by a third sub-decoder of the network device, and decoding video stream segments corresponding to even-numbered picture units in the second plurality of picture units by a fourth sub-decoder of the network device; and playing the main video, the first plurality of video stream segments and the second plurality of video stream segments.

19. The non-transitory computer readable medium according to claim 15, wherein, when the time of the video bullet screen is less than $(N+1)*T$, the preprocessing further comprises repeating the video bullet screen to reach the time of $(N+1)*T$; or when the time of the video bullet screen is greater than $(N+1)*T$, the preprocessing further comprises intercepting the first $(N+1)*T$ time part of the video bullet screen.

20. A method executed by a network device, wherein the method comprises:

obtaining a main video and a plurality of video stream segments, wherein the plurality of video stream segments are generated by preprocessing a video bullet screen by a server, and the preprocessing comprises jointly dividing the video bullet screen in time and space so that the plurality of video stream segments continuously translate in space by frame with time, the area of the screen used for playing the plurality of video stream segments is divided into continuous N picture units in the horizontal direction, each picture unit is used for playing the corresponding video stream segments, and the time from the left edge of the first frame of the corresponding video stream segment entering the picture unit from the right side of the picture unit to the left edge of the Kth frame leaving the picture unit from the left side of the picture unit is T;

decoding the main video by the main decoder of the network device;

a first sub-decoder of network device decodes video stream segments corresponding to every third picture unit beginning with a first picture unit among the N picture units, a second sub-decoder of network device decodes video stream segments corresponding to every third picture unit beginning with a second picture unit among the N picture units, and a third sub-decoder of the network device decodes video stream segments corresponding to every third picture unit beginning with a third picture unit among the N picture units; and playing the main video and the video stream segments.

* * * * *